United States Patent [19]
Murphy et al.

[11] Patent Number: 5,604,906
[45] Date of Patent: Feb. 18, 1997

[54] METHOD AND APPARATUS FOR INSTALLING SOFTWARE BLOCK-BY BLOCK VIA AN IMAGE OF THE TARGET STORAGE DEVICE

[75] Inventors: Colm J. Murphy; John L. Stanley, both of Cork, Ireland

[73] Assignee: Apple Computer, Inc.

[21] Appl. No.: 383,864

[22] Filed: Feb. 6, 1995

[51] Int. Cl.$^6$ ............................................. G06F 15/16
[52] U.S. Cl. ............................................. 395/712
[58] Field of Search .................. 364/130; 395/600, 395/650, 700, 800

[56] References Cited

U.S. PATENT DOCUMENTS

| | | | |
|---|---|---|---|
| 4,724,521 | 2/1988 | Carron et al. | 395/700 |
| 5,155,847 | 10/1992 | Kirovac et al. | 395/600 |
| 5,162,986 | 11/1992 | Graber et al. | 364/146 |
| 5,257,377 | 10/1993 | Satai et al. | 395/700 |
| 5,274,808 | 12/1993 | Miyao et al. | 395/650 |
| 5,287,515 | 2/1994 | Murai | 395/700 |
| 5,295,263 | 3/1994 | Kojima | 395/650 |
| 5,349,657 | 9/1994 | Lee | 395/650 |
| 5,421,009 | 5/1995 | Platt | 395/600 |
| 5,437,012 | 7/1995 | Mahajan | 395/164 |

FOREIGN PATENT DOCUMENTS 4-188224  7/1992  Japan .

*Primary Examiner*—Lance L. Barry
*Attorney, Agent, or Firm*—Burns, Doane, Swecker & Mathis, L.L.P.

[57] ABSTRACT

To accelerate the process of installing software on a number of computers, an image is created with the same formatting as the target drive in each computer onto which the software is to be installed. To do so, a controller determines the manner in which target drives on the computers are formatted. The image drive is then created with the same formatting, using the known target drives as a frame of reference. Once the image drive has been created and the desired software bundle loaded onto it, the software is installed on the computers from the image file, on a block-by-block basis, rather than utilizing individual file transfer under the control of a higher level file management program.

30 Claims, 5 Drawing Sheets

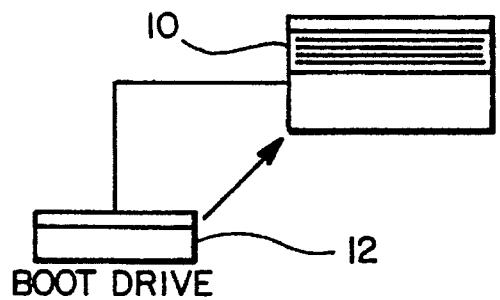
FIG_1
(PRIOR ART)
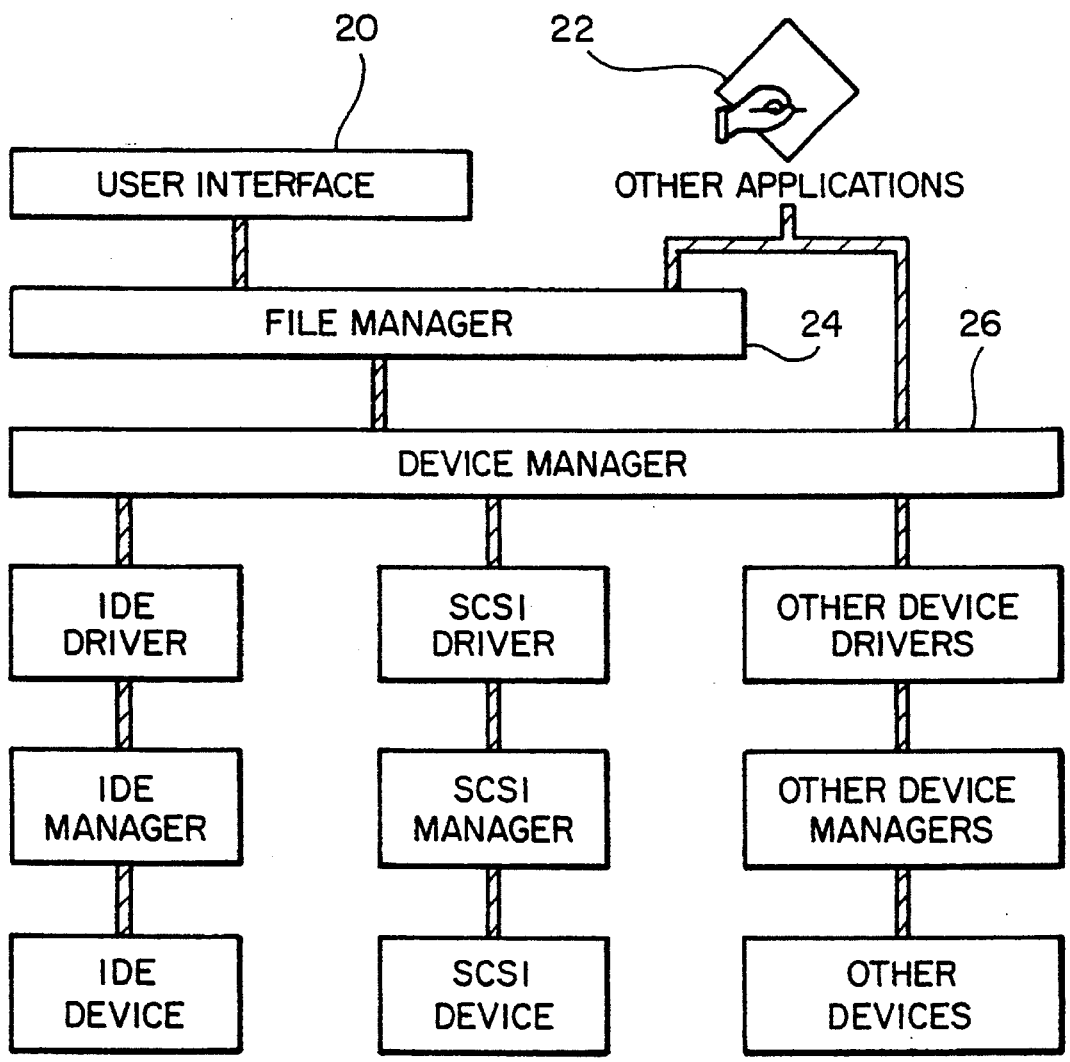
FIG_3
(PRIOR ART)

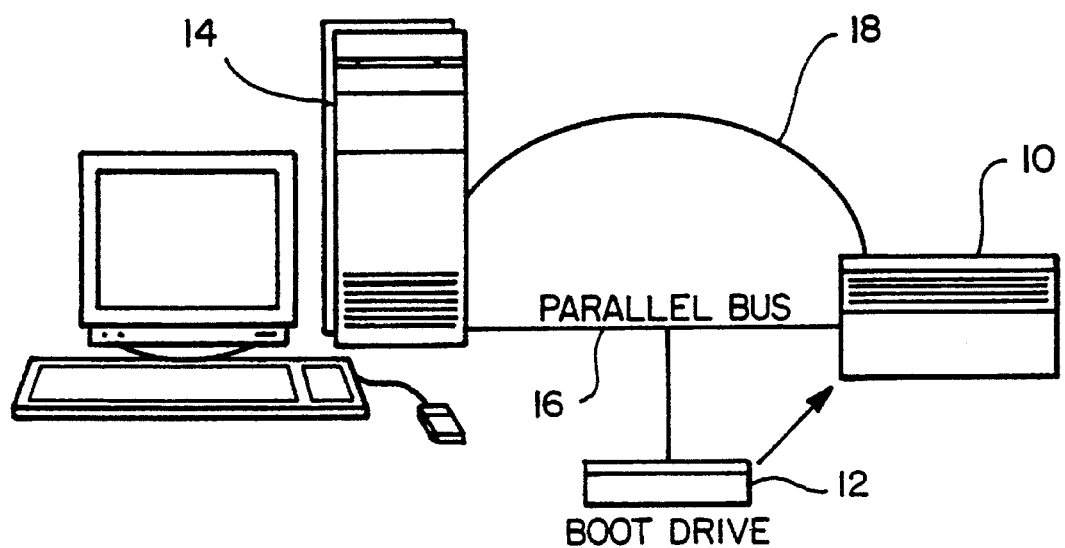
FIG_2
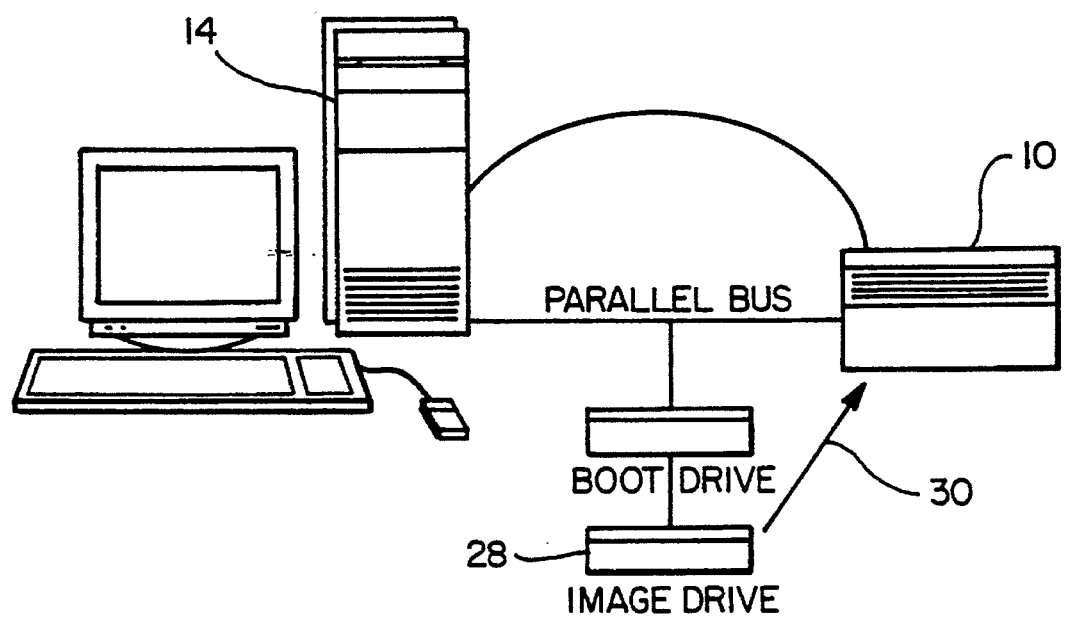
FIG_4

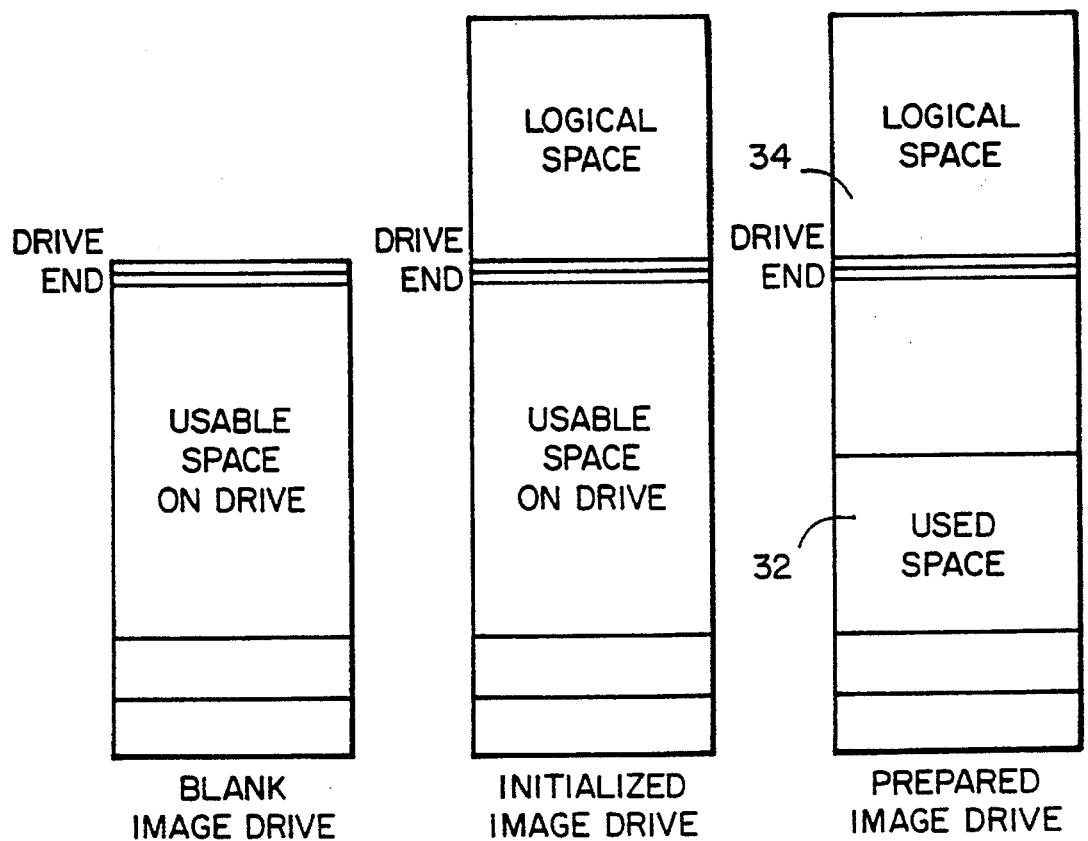
FIG_5
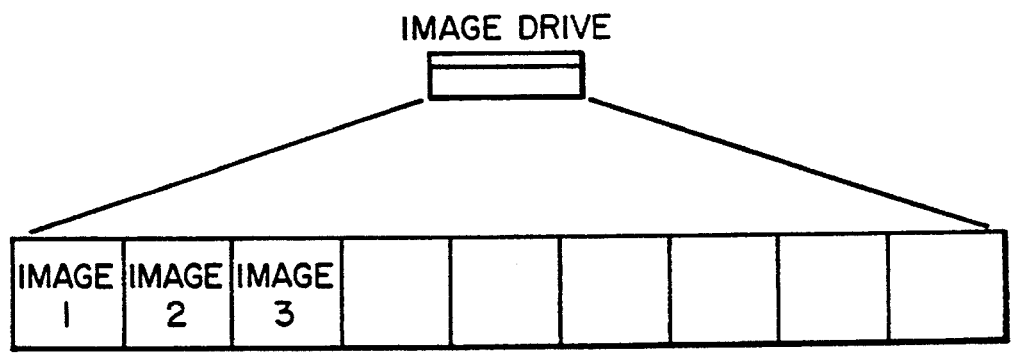
FIG_7

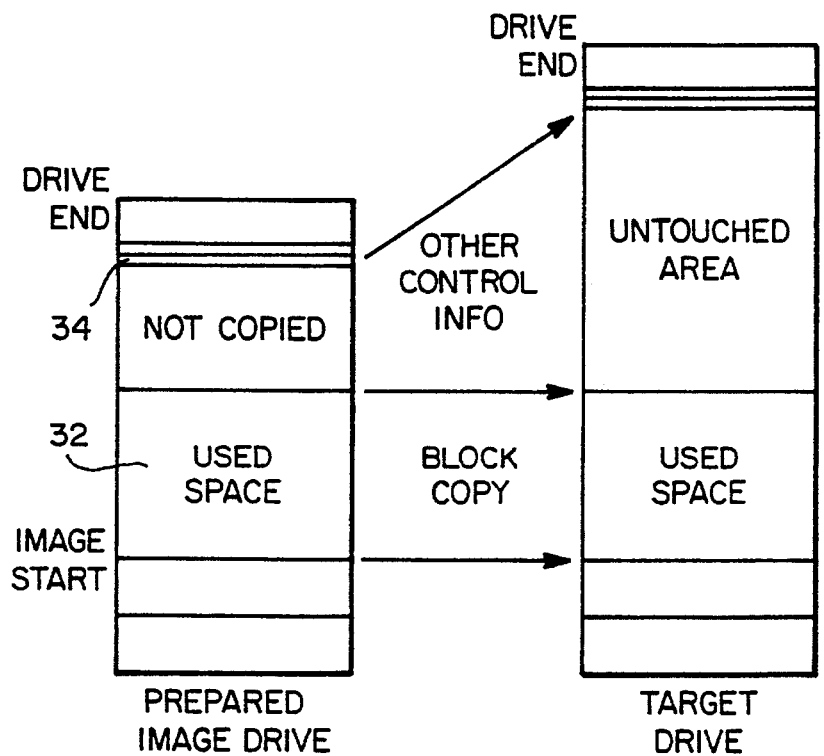
FIG_6
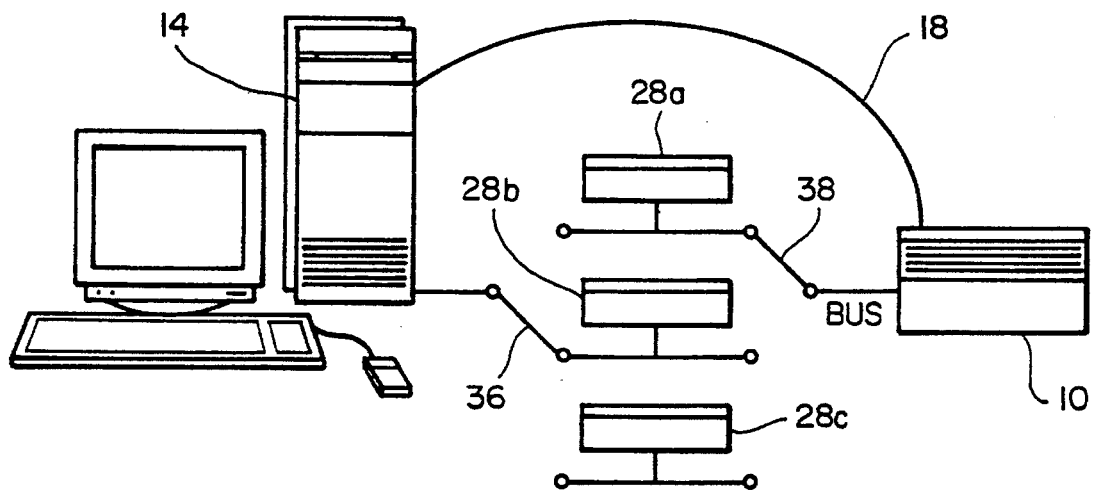
FIG_9

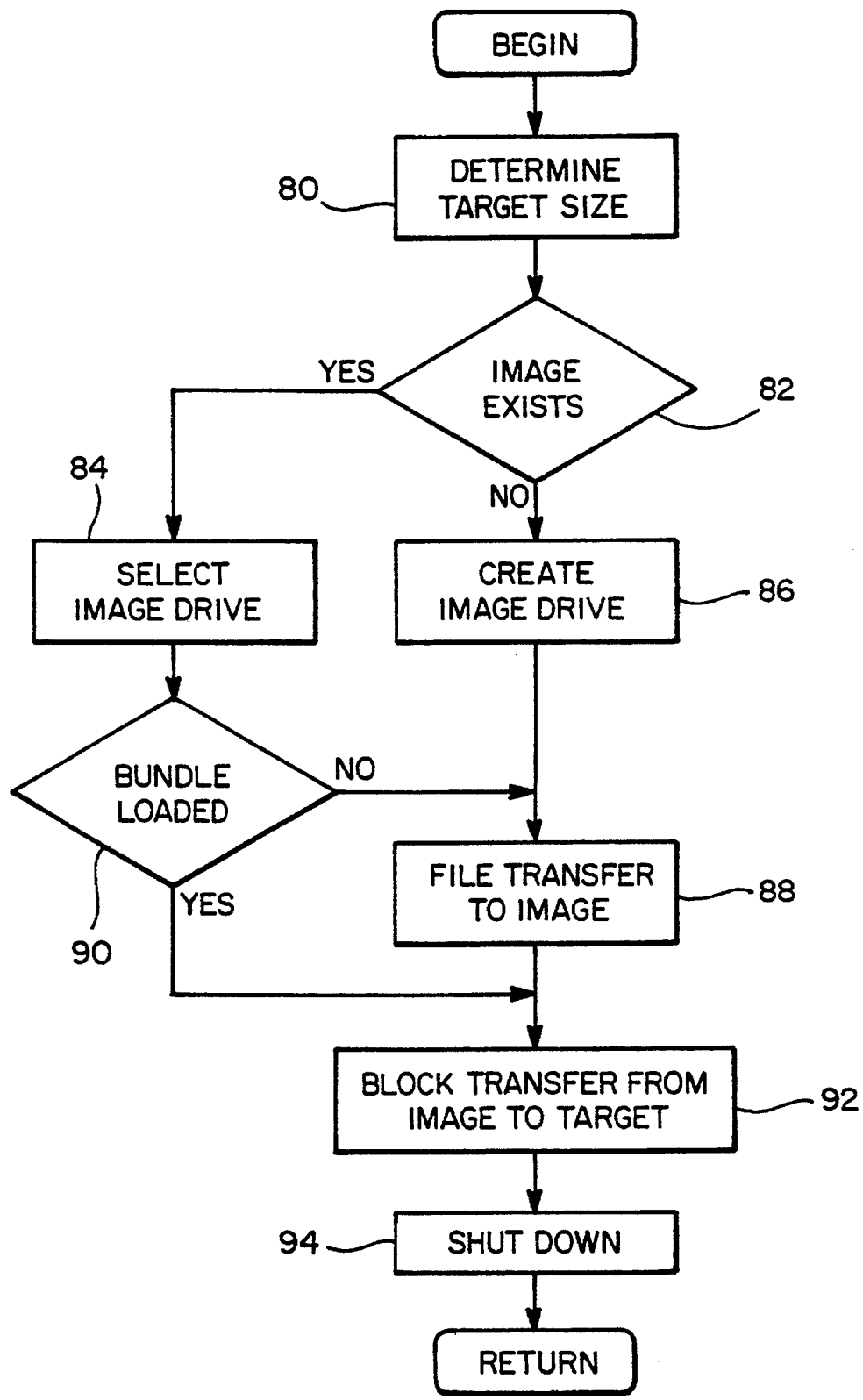
FIG_8

METHOD AND APPARATUS FOR INSTALLING SOFTWARE BLOCK-BY BLOCK VIA AN IMAGE OF THE TARGET STORAGE DEVICE

FIELD OF THE INVENTION

The present invention is directed to the process of downloading software onto computers, particularly the downloading of pre-bundled software as part of the computer manufacturing process.

BACKGROUND OF THE INVENTION

Typically, most personal computers are sold to consumers with certain software programs preloaded on internal non-volatile memory, such as a hard disk or the like. For example, operating system software, which is necessary for the operation of the computer, is typically loaded onto the computer's hard disk at the time of manufacture. Depending upon the intended use of the computer, other types of programs may also be loaded at the manufacturing site, for example networking software or a certain applications programs.

The installation of system software and other programs onto individual computers can be carried out in a number of different ways. For example, the software can be copied from diskettes that are inserted into the computers, or downloaded over a network to which the computers are connected. In a manufacturing environment, the software can be transferred to the computer by means of a cable connected between the computer of interest and the source of software to be installed. For example, the computer of interest can be connected to an external disk drive which contains a bundle of software to be installed. To carry out the installation process, the computer is turned on and boots itself from the external drive. As part of the booting process, the computer loads an installation program, which causes the bundle of software to be copied onto the internal disk drive of the computer.

While these various approaches to installing system software are straightforward, they are disadvantageous by virtue of the fact that they are relatively slow. In particular, each computer is required to boot and launch its own installation application. In addition, the speed of transfer is dictated by the speed of the computer itself. It is not uncommon that the total installation process might take up to forty-five minutes per computer being manufactured. It will be appreciated that, in an environment in which large numbers of computers are being manufactured, the time required to install the software can present a significant bottleneck in the overall manufacturing process.

In an effort to increase the speed of installation, a control computer can be employed to take over some of the tasks that are carried out during the process. In this arrangement, the computer of interest, i.e. the one under manufacture, is connected to a host controller, typically a higher speed computer, via a serial cable or external bus. The controller causes the appropriate bundle of software to be downloaded onto the computer's internal disk drive, for example from a disk drive within the controller or from one that is external to both the controller and the computer. In essence, the controller functions as if the disk drive of the computer of interest is a normal external drive. In this operation, the computer of interest is passive, and the transfer takes place at the controller's speed, rather than that of the computer. In addition, the installation process is streamlined, since the computer itself is not required to go through a complete boot process.

While the use of an external controller to manage the software installation process has decreased the time required to carry out the process, inherent delays are still present. For example, the copying of the software from the source drive to the computer's disk drive takes place on a file-by-file basis. When this approach is employed, the copying of each file is handled through a file management portion of the controller's operating system. Typically, the file manager resides at a high level of the system software, and must pass each copy request through several software layers to the low-level device managers which actually control the physical devices, such as the disk drives. As the request is passed to each subsequent layer, additional complexity is added, which consumes additional time. For software programs which contain a large number of small files, such as a typical operating system, it will be appreciated that the need to process each file copy request in this manner presents a considerable delay factor.

Accordingly, it is an objective of the present invention to provide a software installation process which can avoid the need for file-by-file transfers, and thereby increase the speed of the overall downloading process.

BRIEF STATEMENT OF THE INVENTION

To accelerate the process of installing software on a number of computers, an image is created of a target device in the computers onto which the software is to be installed, such a disk drive. This image device can be created on a RAM disk within a controller, or embodied in a separate disk drive. The software to be installed is copied from the image device to the target device on a low-level block-by-block basis, rather than utilizing a file transfer process under the control of a higher level file management program. As a result, the transfer rate is substantially increased.

In the implementation of this procedure, the image device is created with the same formatting as the target devices in the computers of interest. To do so, the controller is provided with information that describes the manner in which the target device on the computer of interest is formatted. The image device is then created with the same formatting, using the known target device as a frame of reference. Once the image device has been created and the desired software bundle loaded onto it, the software is installed from the image device onto all of the computers of interest with the same type of target device, on a block-by-block basis. The ability to transfer the software in blocks in this manner provides a significant increase in the rate at which software is installed on multiple computers.

Further features of the invention, and the advantages offered thereby, are explained in detail hereinafter with reference to specific embodiments illustrated in the accompanying drawings.

BRIEF DESCRIPTION OF THE DRAWINGS

FIG. 1 is a schematic diagram of one system for installing software onto a computer;

FIG. 2 is a schematic diagram of another system for installing software onto a computer;

FIG. 3 is a block diagram of an exemplary architecture for the file and device management portions of an operating system;

FIG. 4 is a schematic diagram of one system for installing software in accordance with the present invention;

FIG. 5 is an illustration of the steps in the creation of the image drive;

FIG. 6 is an illustration of the copying of data from the image drive to a target drive;

FIG. 7 is a diagram of a partitioned image drive;

FIG. 8 is a flow chart of one embodiment of the software installation process carried out with the system of FIG. 4; and FIG. 9 is a schematic diagram of an alternative embodiment of the invention.

DETAILED DESCRIPTION

To facilitate an understanding of the principles which underlie the present invention, it is described hereinafter with respect to its application in specific situations. For example, the invention is particularly applicable to the manufacture of new computers, where operating system software is installed on disk drives in the computers before delivery to the customer. It will be appreciated, however, that this is not the only practical application of the invention. Rather, it will find utility in any situation in which it is desirable to install software onto multiple storage devices, either as part of or separate from a computer manufacturing process.

Similarly, to illustrate specific concepts within the implementation of the invention, reference is occasionally made to the architecture of a Macintosh-type computer manufactured by Apple Computer, Inc. Again, it will be appreciated that this specific embodiment is merely exemplary, and that the invention can be applied to any type of computer.

To provide a thorough understanding of the concepts which underlie the present invention, a brief description will first be made of various approaches to the downloading of one or more bundles of software onto a computer. Referring to FIG. 1, in one approach, the computer 10 onto which the software is to be installed performs all of the downloading actions itself. In this approach, an external boot drive 12 is connected to the computer 10 by means of a bus cable, for example, one which complies with the Small Computer System Interface (SCSI) specification. The external boot drive 12 includes a disk which contains the necessary system software for starting up, or booting, the computer 10, and an application program for copying files from the boot drive 12 to the computer 10. The boot drive 12 may also contain the bundle of software that is to be loaded onto the computer 10, or this software might be stored on a network or other disk drives (not shown) that are connected to the computer 10.

In operation, upon being powered up, the computer 10 boots from the external boot drive 12, and launches the file transfer application. This application causes the computer 10 to locate the bundle of software that is needed, for example from the boot drive, and copy this bundle, in its entirety, onto its own internal disk drive. This copying operation takes place on a file-by-file basis, under the control of a high level file management system within the operating system from which the computer was booted. After all of the files have been copied, the computer 10 checksums the copied bundle, to verify its integrity, and performs a shutdown operation. One of the main advantages of this approach is that it is simple and can be easily incorporated into other software, such as testing software that is used at the manufacturing site.

While this type of action is relatively straightforward, it has certain inherent limitations. First, it is relatively slow, since each computer has to boot and launch its own file transfer application. Also, the speed of transfer is dictated by the speed of the computer itself, so that the download time for a given bundle may vary considerably from one type of computer to another. Secondly, if the desired bundle of software is present on external drives the updating of these drives can consume a lot of time, particularly if there are a considerable number of stations at which software downloading takes place.

FIG. 2 illustrates a different setup for downloading software, which addresses some of the limitations associated with the arrangement of FIG. 1. In the embodiment of FIG. 2, the computer 10 is connected to a host controller 14 as well as the external boot drive 12. The controller 14 can be a relatively high-speed computer which might be part of a network, for example. The computer 10 is connected to the controller 14 by means of a bus 16 which is also connected to the boot drive 12. Preferably, the computer 10 is also connected to the controller 14 by a serial cable 18, to facilitate communications between these two devices. In the operation of this arrangement, after the computer 10 is powered up, it begins to boot itself from the boot drive 12. Instead of a normal boot process in which operating system files are loaded into the computer's memory, the boot process is interrupted after necessary drivers have been loaded. Among the drivers which are loaded is a boot driver which causes the computer 10 to behave like an external hard disk drive or other storage device. This boot driver can be loaded from the boot drive 12, or from any other device which is connected to the computer 10. For further information regarding such a driver, reference is made to commonly assigned, copending application Ser. Nos. 08/383,863 and 08/383,923, the disclosures of which are incorporated herein by reference thereto. During the boot process, the computer 10 begins to execute this driver, which forces it to terminate all activity on the bus 16. At this point, the computer 10 communicates with the controller 14 over the serial link 18, under the direction of the driver. This communication informs the controller that the computer 10 has successfully started.

After receiving this communication, the controller downloads the required software bundle onto the internal disk drive of the computer 10. In carrying out this operation, the controller 14 treats the disk drive of the computer 10 as a normal external disk drive, and downloads the software onto it. During this time, the computer 10 is passive, except for carrying out operations such as the transfer of downloaded data from the external bus 16 to an internal bus connected to the target drive, if necessary. The software to be downloaded onto the computer 10 can be stored on the external boot drive 12 or a network, but is more preferably stored on an internal drive of the controller 14.

The arrangement illustrated in FIG. 2 provides an increase in speed for the downloading process. This increased speed results from the fact that there is no appreciable boot time, since the computer 10 initiates the boot process but is very quickly put into an idle mode by the boot driver. In addition, the downloading operation itself is carried out at the speed of the controller, rather than that of the computer 10. Typically, the controller 14 will be a much higher speed computer than the computer 10 onto which the software is being downloaded. Further in this regard, additional speed is obtained if the software bundle is cached on a RAM disk in the controller 14. If the controller has a dual bus configuration, where one bus is connected to its internal devices and the external bus 16 is separate, additional speed is made possible by operating the two busses in parallel. For example, read requests can be sent to the internal disk drive or RAM disk over the internal bus at the same time as write commands are being sent to the computer 10 over the external bus.

Another advantage offered by the arrangement of FIG. 2 is that of software bundle management. The controller can be connected to a network, so that the downloading of new and updated software bundles is a much easier operation than that required for the arrangement in FIG. 1, in which the external boot drive 12 has to be physically disconnected from the computer 10 and updated. In the arrangement of FIG. 2, new bundles can be downloaded over the network while the controller is idle, and this updating can take place automatically over a number of stations at one time.

While the arrangement of FIG. 2 offers increased speed in the downloading process, the maximum obtainable speed is inherently limited by the fact that the copying of the files from the source to the target drive in the computer 10 is carried out on a file-by-file basis. In particular, this operation is conducted under the control of the file manager portion of the computers' operating system. For a better understanding of this concept, the architecture of a typical operating system will be briefly described. Most operating systems adopt a layered approach as shown in FIG. 3. In order for an operating system to perform a standard operation of copying information from one device to another, a number of managers and device drivers are used. The example of FIG. 3 relates to a computer which has a number of different types of devices. For example, the computer may have one or more SCSI devices, such as the external I/O port connected to the bus 16, an IDE device such as a hard disk drive, and other devices such as a video controller, CD-ROM drive, and the like. Each such device has an associated driver and/or manager.

Generally, a request to copy information comes in at a very high level in the operating system, and the operating system passes the request to a lower level, which in turn passes the request to subsequently lower levels. Each level or layer in the process typically adds some information to the request, and this process continues until the request reaches a device manager layer that communicates directly with the device.

This layered approach is generally desirable, since the addition of each layer isolates the user one step further from generally unimportant information regarding the specific operation of the system. If a user wants to copy a file from one drive to another, the user is generally uninterested in the file structure on the drives and the exact cylinder, head and sector locations of all the information on the drive, for example.

The top levels of the system are controlled by the user interface 20 and other custom application programs 22. When a user requests a copy of a file from one device to another, the user interface or custom application passes the request to a file manager 24, indicating the files that the user wishes to copy and also including information regarding the source and target devices. The file manager locates the requested file(s) within the file system on the source device and passes the appropriate read and write requests to a device manager 26 to perform the operations to or from the appropriate devices. When the device manager receives a request to read a number of blocks from a device, it decides which device driver controls that device and issues the read request to the driver which uses its respective manager to communicate to the device.

In summary, by using the layered model, the user is shielded from the underlying managers and operations that are needed to perform and execute the high level request. Traditional file copy applications place all requests through the file manager, which then passes each read/write request down to the lower layers. As a result, software bundles which contain a large number of individual files, such as an operating system, can require a considerable amount of time to transfer.

To further increase the rate at which software bundles are transferred from a source drive to the target drive in the computer 10, in accordance with the present invention the copying operation is carried out on a block-by-block basis, rather than a file-by-file basis. In this type of operation, low level device driver and manager calls are used to perform the transfer, rather than the higher level file manager calls that are used to copy individual files. An arrangement for carrying out the downloading operation in this manner is illustrated in FIG. 4. Referring thereto, in this enhanced mode of operation, the controller 14 creates an image of the disk drive onto which the software is to be copied. Preferably, this image is created in the controller's internal RAM. For explanation purposes, however, the image drive is illustrated in FIG. 4 as a separate external drive 28. It will be appreciated, of course, that the image drive could actually be created on an external device, such as a RAM disk or a hard disk drive, as illustrated in FIG. 4, rather than in the controller's internal memory.

In operation, the controller 14 creates a disk image of the disk on the target computer where the software bundle is to be downloaded. This creation of the image drive is carried out using standard operations, in which the software bundle is downloaded to the image drive and its integrity is verified, for example, by means of a checksum operation. Thereafter, a target computer 10 is connected to the controller and powered up. Preferably, the computer 10 is connected as in the arrangement of FIG. 2, where it starts to boot from the driver on the boot drive 12, and communicates with the controller over the serial cable 18 to inform the controller when it can have access to the bus 16. The controller then downloads the software bundle onto the internal disk drive of the computer 10. This is accomplished by means of a very fast block-to-block transfer from the image drive 20 to the target drive of the computer 10, as illustrated by the arrow 30 in FIG. 4. In this transfer, all read and write operation requests are passed from the transfer application program directly to the device manager 26 in the controller's operating system, bypassing the file manager 24.

As an alternative, the downloading of the software bundle from the image drive 28 to the computer 10 can be performed by the computer 10 itself, rather than the controller 14. In this alternative mode of operation, the boot driver that is executed during the boot process carries out the downloading operation. Before it can do so, however, it communicates with the controller 14 over the serial cable 18. Basically, the computer 10 lets the controller 14 know that it is ready to begin the downloading process. In response, the controller 14 informs the computer 10 about the data on the image drive that is to be downloaded. For example, it can inquire about the amount of available memory in the computer 10, and then send information about the number and size of buffers to be set up. The controller can set other system parameters within the computer 10 as well. Also, if the controller 14 has not finished with creating the image drive, it can cause the computer 10 to wait until the drive is ready.

Once the computer 10 receives a command from the controller 14 to proceed, it locates the image drive, and copies what is needed onto its own internal drive, using a block-to-block transfer procedure. This copying operation can be performed under the control of a standard operating system that is loaded during the boot process. After the transfer has been completed, the computer 10 can perform a checksum on the copied data, or any other integrity verification procedure. The computer 10 then lets the controller 14 know that it has completed the software transfer, and performs a shutdown operation.

In order for the block transfer to be carried most efficiently, the blocks of data stored on the image drive should be of the same size as blocks stored on the target drive in the computer 10. In a manufacturing operation, software bundles may need to be loaded onto a variety of different types of computers and target drives. Not all target drives necessarily have the same formatting, however. In particular, the size of storage blocks may vary in dependence upon the size of the target drive. In this case, if the target drive is divided into more than one partition, the block formatting will likewise depend upon the size of the partition onto which the software is to be loaded. Accordingly, when creating the image drive 28, the controller preferably formats it in the same manner as the target drive is formatted. In other words, the target drive forms a frame of reference for the image drive. When the size of the target drive is changed, a new image drive with corresponding formatting is used. The source and target devices need not be physically identical, but the source drive should mimic the structure of the target drive, such that they behave identically from a file system point of view.

For example, the system might contain a source device which is a 500 Mb hard disk and a target device which is a 1 Gb hard drive. The 500 Mb drive, or at least one partition on the 500 Mb drive, is initialized to appear identical to the file system structure of the 1 Gb device. When this is done, the file manager essentially treats this image drive as physically containing 1 Gb of storage, even though it is really only a 500 Mb disk.

After the drive initialization operation has been performed, the desired target drive software is copied to the source drive to prepare the source image. This copying operation is performed at the file manager level, since the file manager is able to physically create and copy file contents and to update the internal file system structures needed to keep track of the files and to maintain the file system.

When the file manager has copied the last file to the image drive, the used portion of the drive that contains the information that is to be copied can be considered a source image that can be copied to any target drive. This source image starts at the first block in the relevant partition of the source drive and continues up to and including the last used block within the partition. In some file systems, extra blocks within the drive may also need to be considered part of the image. These blocks include those that reside outside the block range containing the software to be downloaded and store control information about the file system or about files within the image portion of the device.

FIG. 5 shows the three steps involved in image drive preparation. FIG. 5 shows a blank device (in this case a hard drive), that contains no data. FIG. 5 shows the image drive after a portion of the drive has been initialized to contain a file system structure similar to that of a much larger drive. In this case the file system within this portion of the drive behaves as if it has a much larger capacity into which it can write data. The area beyond the physical end of the partition that the file system assumes that it can use is called the logical area. The image preparation control software ensures that the drive never tries to read or write to/from blocks within the logical area. Of course, the physical storage capacity of the source device can be the same as that of the target device, or even larger. The only requirement is that it be large enough to store all of the software that is to be loaded onto the target computer.

FIG. 5 shows the status of the image drive after it has been prepared with the data to be copied. The image contains the blocks of data 32 that were copied to the image drive, as well as other blocks of data 34 that contain control information for the file system.

The downloading operation is based on the principle that, in order to copy the entire file contents from one drive to another, the only portions that need to be copied are each block from the start of the partition up to and including the last used block in the partition (area 32) and those blocks of data 34 that contain other control data for the file system. FIG. 6 shows this downloading operation. A physically smaller image drive 28 contains the image, as described above, and the appropriate blocks 32, 34 in the image partition are downloaded to the target drive.

Many file systems support multiple partitions within a single device. These partitions normally behave to the user as if they were separate devices, even though they are physically located within a single device. When used in a file system that supports multiple partitions, the source image device can be made to support multiple source images. Each source image can be pre-prepared to be of any physical size as long as it is smaller than the physical size of the source device, i.e. the image drive 28, and can be initialized to mimic any other device's geometry. FIG. 7 shows an example of a source device that has been partitioned into a number of physically different partitions. Each of these partitions can mimic any size target device. Therefore, the image drive can contain any number of completely different images.

In order for the image drive to be initialized, the controller 14 needs to know relevant information about the target drive, particularly its size, since that determines block allocation. If one or more image drives are to be prepared ahead of time, i.e. before being connected to the computer 10, this information needs to be provided to the controller beforehand. There are a number of different ways in which this information can be provided to the controller. For example, it can be manually entered by an operator at the beginning of each new batch of computers to be processed. Alternatively, it can be transferred to the controller electronically, for example via an information transfer system at the manufacturing site. In situations in which the computer is connected to the controller, however, the formatting particulars are obtained automatically through information that is exchanged between the controller 14 and the computer 10 as part of the file transfer and verification process.

A flow chart which illustrates the preferred downloading process is shown in FIG. 8. Referring thereto, when the software downloading process is initiated, the controller first determines the size, and hence the formatting, of the target drive (Step 80). The controller then checks to see if an image drive with the correct formatting already exists (Step 82). In this regard, if target drive sizes are known, a number of different image drives, each with different formats corresponding to the known sizes, can be prepared ahead of time, for example on one or more external drives. If an image drive with the proper formatting already exists, it is selected at Step 84 so that all source read commands are addressed to it. If it has not already been prepared, the image drive is created at Step 86, as described in connection with FIGS. 5a–5c. The image disk is created with the same formatting as the target drive, as determined at Step 80. Thus, for example, if the target drive has two partitions, which are respectively assigned to the computer's operating system and a network operating system, the image drive is set up in the same manner. The software bundle is then downloaded onto the image drive at Step 88, using a conventional file transfer process. If the image drive had been prepared previously, the selected drive is checked at Step 90 to determine whether it already contains the software bundle. If not, the process proceeds to Step 88, where it is downloaded.

Subsequently, the controller copies the software bundle to the target drive from the image drive, using the block transfer process (Step 92), as described previously in connection with FIG. 6. The computer 10 is then shut down at Step 94, after which it is disconnected from the controller 14.

An alternative embodiment of the invention, which includes multiple image devices as described above, is illustrated in FIG. 9. Referring thereto, the controller 14 and the computer 10 are separately connected to the image drives 28a, 28b, 28c by means of two respective bus switches 36 and 38. These two switches are operated independently of one another, so that the controller 14 can be connected to one image device while the computer 10 is connected to a different image device. In this manner, the controller 14 can prepare one image device while the computer 10 is downloading software from a different device. The actuation of both of the switches is controlled by the controller 14, for example via a serial protocol.

In the alternate embodiment of FIG. 9, any one or more of the multiple drives 28a, 28b and 28c can have multiple partitions, as in the embodiment of FIG. 7. As such, multiple image drives can be created on each of the multiple disk drives, to provide a wide range of flexibility in a manufacturing environment, for example, where many different types of computer configurations might be encountered.

This arrangement with plural bus switches also has the advantage of isolating the controller's bus from that of the computer 10, thereby eliminating bus conflicts and contentions. In addition, the identification of the external devices 18a–18c can be completely independent of the device identifications and number of devices associated with the computer 10. As a result, in those situations in which a given bus has a maximum number of devices that can be connected to it, the number of devices that can be connected to the controller 14 is not limited by the number of devices associated with the computer 10, such as internal disk drives and the like.

From the foregoing, it can be seen that the present invention expedites the downloading of software bundles onto multiple computers. By copying the software onto target drives from an image drive with a lower level block transfer process, rather than a higher-level file transfer process, the entire transfer operation can be accomplished much more quickly. In essence, the transfer can take place at the maximum speeds allowed by the source and target devices, as well as the bus protocol, since it is independent of the file system. Furthermore, each individual computer is not required to go through a complete boot process before the transfer takes place, providing an additional time savings. Furthermore, if the transfer is carried out by high speed controller, additional time savings are achieved.

It will be appreciated by those of ordinary skill in the art that the present invention can be embodied in other specific forms without departing from the spirit or essential characteristics thereof. For example, while the present invention has been specifically described in connection with the downloading of software onto disk drives, it will be appreciated that it is applicable to any type of storage device, such as a PCMCIA card, for instance. This flexibility is provided by virtue of the fact that the operations are carried out at the device manager level, which renders them device independent. The presently disclosed embodiments are therefore considered in all respects to be illustrative, and not restrictive. The scope of the invention is indicated by the appended claims rather than the foregoing description, and all changes that come within the meaning and range of equivalents thereof are intended to be embraced therein.

What is claimed is:

1. A system for downloading a software bundle onto a computer, comprising:

a controller for controlling the downloading of the software bundle onto computers;

means associated with said controller for creating an image of a storage device of the type onto which the software bundle is to be downloaded, and for copying said software bundle onto said image device;

at least one connector device which connects a computer to said controller and said image device; and means for copying the software bundle from said image device to a storage medium on a connected computer on a block-by-block basis.

2. The system of claim 1 wherein said image device is created in random access memory associated with said controller.

3. The system of claim 1 wherein said image storage medium is created on a disk drive that is external to said controller.

4. The system of claim 3 wherein said disk drive contains multiple partitions, and a separate image storage medium is created on each of said multiple partitions.

5. The system of claim 3 wherein the operation of said copying means is controlled by said controller.

6. The system of claim 1 wherein the operation of said copying means is controlled by said controller.

7. The system of claim 1 wherein the operation of said copying means is controlled by the connected computer.

8. The system of claim 1 wherein said connector device includes a first cable connected between the computer and said controller for transmitting communication therebetween, and a second cable connected between the computer and said image device for permitting said copying to take place.

9. The system of claim 8 wherein said first cable is a serial cable and said second cable is a bus cable.

10. The system of claim 8 wherein said second cable is also connected to said controller.

11. The system of claim 1 wherein said means for creating an image device creates a plurality of image devices, and further including means for selectively connecting said controller and a computer to selected ones of said image devices.

12. The system of claim 11 wherein said selective connecting means connects said controller to one of said image devices while said computer is connected to a different one of said image devices.

13. The system of claim 12 wherein said image device creating means creates one of said image devices while said copying means copies the software bundle from a different one of said image devices.

14. The system of claim 1 comprising a plurality of connector devices for separately connecting said controller and a computer to said image device.

15. A method for downloading a software bundle onto a multiplicity of storage devices, comprising the steps of:
   a) creating an image device which replicates the storage capabilities of said storage devices;
   b) copying software files from said bundle to said image device;
   c) connecting one of said storage devices to said image device;
   d) copying the software stored on said image device to the connected storage device on a block-by-block basis;
   e) disconnecting the storage device from the image device; and
   f) repeating steps c, d and e for each of the other storage devices in said multiplicity of storage devices.

16. The method of claim 15 wherein the step of creating an image device includes the steps of determining the formatting of said storage devices and initializing said image device to have the same formatting.

17. The method of claim 16 wherein said formatting is determined from the storage capacity of the storage devices.

18. The method of claim 15 wherein said step of copying software from said image device to a connected storage device is carried out via commands sent directly from a user to a device manager within a computer operating system.

19. The method of claim 18 wherein said step of copying files from said bundle to said image device is carried out via a file manager in a computer operating system which sends commands to said device manager.

20. The method of claim 15 wherein said storage devices are disk drives housed within individual respective computers.

21. The method of claim 20 wherein said step of copying software to the connected storage device is carried out under the control of said individual computers.

22. The method of claim 20 wherein said step of copying software to the connected storage device is carried out under the control of a computer other than said individual computers.

23. The method of claim 22 wherein said steps of creating an image device and copying software to said image device are also carried out by said other computer.

24. The method of claim 23 wherein said image device is created on internal random access memory of said other computer.

25. The method of claim 23 wherein said image device is created on a storage device external to said other computer.

26. A method for downloading a software bundle onto a computer, comprising the steps of:
   creating an image of a storage device of the type onto which the software bundle is to be downloaded;
   copying said software bundle onto said image device;
   connecting a computer to said image device; and
   copying the software bundle from said image device to a storage medium on a connected computer on a block-by-block basis.

27. The method of claim 26 wherein the step of creating an image device includes the steps of determining the formatting of said storage medium and initializing said image device to have the same formatting.

28. The method of claim 27 wherein said formatting is determined from the storage capacity of the storage medium.

29. The method of claim 26 wherein said step of copying software from said image device to a connected storage medium is carried out via commands sent directly from a user to a device manager within a computer operating system.

30. The method of claim 29 wherein said step of copying files from said bundle to said image device is carried out via a file manager in a computer operating system which sends commands to said device manager.

* * * * *